US012777030B2

(12) United States Patent
Takahashi

(10) Patent No.: US 12,777,030 B2
(45) Date of Patent: Oct. 27, 2026

(54) INFORMATION PROCESSING APPARATUS, IMAGE FORMING APPARATUS, AND PROCESSING METHOD

(71) Applicant: SHARP KABUSHIKI KAISHA, Sakai City (JP)

(72) Inventor: Yuto Takahashi, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 0 days.

(21) Appl. No.: 18/669,319

(22) Filed: May 20, 2024

(65) Prior Publication Data

US 2024/0405991 A1 Dec. 5, 2024

(30) Foreign Application Priority Data

Jun. 1, 2023 (JP) ................................. 2023-091079

(51) Int. Cl.
*H04L 9/40* (2022.01)

(52) U.S. Cl.
CPC ................................ *H04L 63/0807* (2013.01)

(58) Field of Classification Search
None
See application file for complete search history.

(56) References Cited

U.S. PATENT DOCUMENTS

| | | | | |
|---|---|---|---|---|
| 9,306,923 | B2 | 4/2016 | Matsugashita | |
| 2014/0090028 | A1 | 3/2014 | Matsugashita | |
| 2015/0029533 | A1* | 1/2015 | Sato | G06F 16/9562 358/1.14 |
| 2019/0306146 | A1* | 10/2019 | Kondo | G06F 3/1203 |
| 2020/0301591 | A1* | 9/2020 | Shinnaka | G06F 21/44 |
| 2021/0112048 | A1 | 4/2021 | Hirosawa | |
| 2022/0317953 | A1* | 10/2022 | Terashima | G06F 3/1287 |
| 2023/0031865 | A1* | 2/2023 | Yoshida | G06F 3/0483 |

FOREIGN PATENT DOCUMENTS

| | | | |
|---|---|---|---|
| EP | 2713300 | A1 | 4/2014 |
| EP | 2713300 | B1 | 11/2016 |
| JP | 2014-067379 | A | 4/2014 |
| JP | 2015027033 | A | 2/2015 |
| JP | 2021060924 | A | 4/2021 |
| JP | 2023064212 | A | 5/2023 |

* cited by examiner

*Primary Examiner* — Boris D Grijalva Lobos
(74) *Attorney, Agent, or Firm* — ScienBiziP, P.C.

(57) ABSTRACT

An information processing apparatus comprises a communicator that communicates with an external service and a server that issues an access token to be used in access to the external service; a controller; and a storage that stores an application, wherein the controller obtains information on the server by executing the application, obtains an authorization code from the server identified by the server's information, and obtains an access token from the server by executing the application using the authorization code.

7 Claims, 13 Drawing Sheets

FIG. 5

| SETTING ITEMS | SETTING VALUES |
|---|---|
| PROVIDER NAME | ExampleProvider |
| CALL TARGET FOR TOKEN OBTAINING FLOW START FUNCTION | http://127.0.0.1:10080/Example/auth |
| CALL TARGET FOR TOKEN OBTAINING FUNCTION | http://127.0.0.1:10080/Example/token |
| SUPPORT FOR AUTHORIZATION CODE FLOW | true |
| SUPPORT FOR DEVICE FLOW | true |

INFORMATION PROCESSING APPARATUS, IMAGE FORMING APPARATUS, AND PROCESSING METHOD

CROSS-REFERENCE TO RELATED APPLICATION

The present application claims priority from Japanese Application JP2023-091079, the content to which is hereby incorporated by reference into this application.

BACKGROUND OF THE INVENTION

1. Field of the Invention

The present disclosure relates to an information processing apparatus and the like.

2. Description of the Related Art

For example, inventions for transmitting, when a request for obtaining authority information from an application of a request source is received, a request for further transferring an authority transferred from a user to the application to an authorization server system together with first authority information and obtaining second authority information issued based on the first authority information from the authorization server system have been proposed.

SUMMARY OF THE INVENTION

An object of the present disclosure is to provide an information processing apparatus and the like capable of obtaining an access token using an application.

According to an aspect of the present disclosure, an information processing apparatus includes a communicator that communicates with an external service and a server that issues an access token to be used in access to the external service, a controller, and a storage that stores an application. The controller obtains information on the server by executing the application, obtains an authorization code from the server identified by the server's information, and obtains an access token from the server by executing the application using the authorization code.

According to another aspect of the present disclosure, an image forming apparatus includes a communicator that communicates with an external service and a server that issues an access token to be used in access to the external service, a first executor that executes a first application stored in advance, and a second executor that executes a second application that is additionally installed. The first executor obtains an authorization code from the server, and the second executor obtains an access token from the server utilizing the authorization code.

According to a further aspect of the present disclosure, a processing method employed in an information processing apparatus that communicates with an external service and a server that issues an access token to be used in access to the external service includes obtaining information on the server by executing the application, obtaining an authorization code from the server identified by the server's information, and obtaining an access token from the server by executing an application using the authorization code.

According to the present disclosure, an access token can be obtained using an application, for example.

BRIEF DESCRIPTION OF THE DRAWINGS

FIG. 5 is a diagram illustrating an example of setting information according to the first embodiment.

DETAILED DESCRIPTION OF THE INVENTION

Embodiments for implementing the present disclosure will be described hereinafter with reference to the accompanying drawings. Note that the embodiments below are merely examples of the present disclosure, and content of the present disclosure is not to be construed as being limited based on the following description.

Some image forming apparatuses, which are a type of information processing apparatus, have a function of performing transmission and reception of data with a server connected via a cloud (such as a resource server). Furthermore, in order to improve security, authentication using an access token acquired by OAuth2.0 authorization, rather than authentication using IDs and passwords, has become essential in mail services and the like used by the image forming apparatuses. In order to cope with such security, it is necessary to implement an OAuth2.0 access token obtaining flow also in the image forming apparatuses.

When the OAuth2.0 access token obtaining flow is implemented in such an image forming apparatus, in general, the access token obtaining flow is required to be implemented for each service provider in a main body function of the image forming apparatus (for example, a system setting to be executed by firmware).

However, in the OAuth2.0 authorization flow, an authentication page provided by a service provider is required to be accessed, and therefore, a change performed by the service provider considerably affects the implementation. When the change performed by the service provider is coped with by the main body function (for example, firmware) of the image forming apparatus as described above, a range of the influence becomes larger and cost increases.

Furthermore, when the image forming apparatus attempts to support service providers other than a service provider supported in advance or support authorization flows other than a supported authorization flow, interfaces provided by the service providers are slightly different from one another, and therefore, cost increases when the supporting is performed for individual cases by the main body function of the image forming apparatus.

In order to solve these problems, the following embodiments describe an image forming apparatus, which is a type of an information processing apparatus, capable of communicating with a server capable of performing authentication and authorization.

1. First Embodiment

1.1 Entire System

Figure 1:
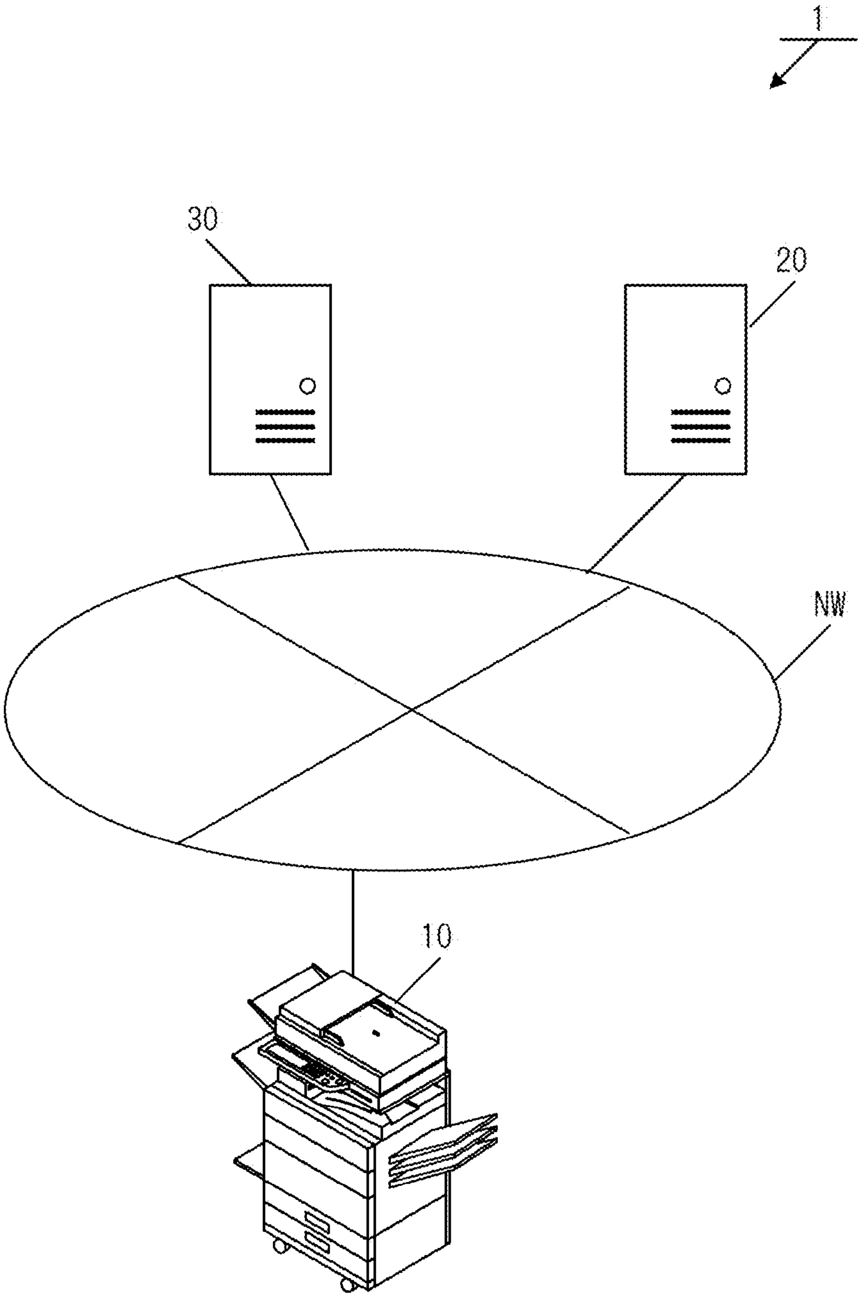
FIG. 1 is a diagram illustrating an outline of a system according to a first embodiment.

FIG. 1 is a diagram illustrating an outline of a system 1. The system 1 includes an image forming apparatus 10 as an example of an information processing apparatus capable of communicating with external services.

In the system 1, the image forming apparatus 10, an authorization server 20 capable of performing authentication and authorization, and a resource server 30 capable of supplying resources from external services may communicate with one another through a network NW.

The image forming apparatus 10 is referred to as a Multifunction Peripheral/Printer/Product (MFP), for example. For example, when executing a job (a print job), the image forming apparatus 10 may form an image on a sheet, that is, a recording medium. The image forming apparatus 10 is capable of executing a plurality of functions including a copy function, a FAX function, a scan function, and a printer function. For example, the image forming apparatus 10 may transmit and receive e-mails by means of a mail service provided by the resource server 30. Furthermore, the image forming apparatus 10 may transmit a scanned image or obtain content stored in the resource server 30, when the resource server 30 provides a service for managing content.

Here, the network NW is a general network and is constituted by the Internet, for example. Note that the network NW may not be a single network or may be configured by a combination with a Local Area Network (LAN), for example.

1.2 Hardware Configuration

Figure 2:
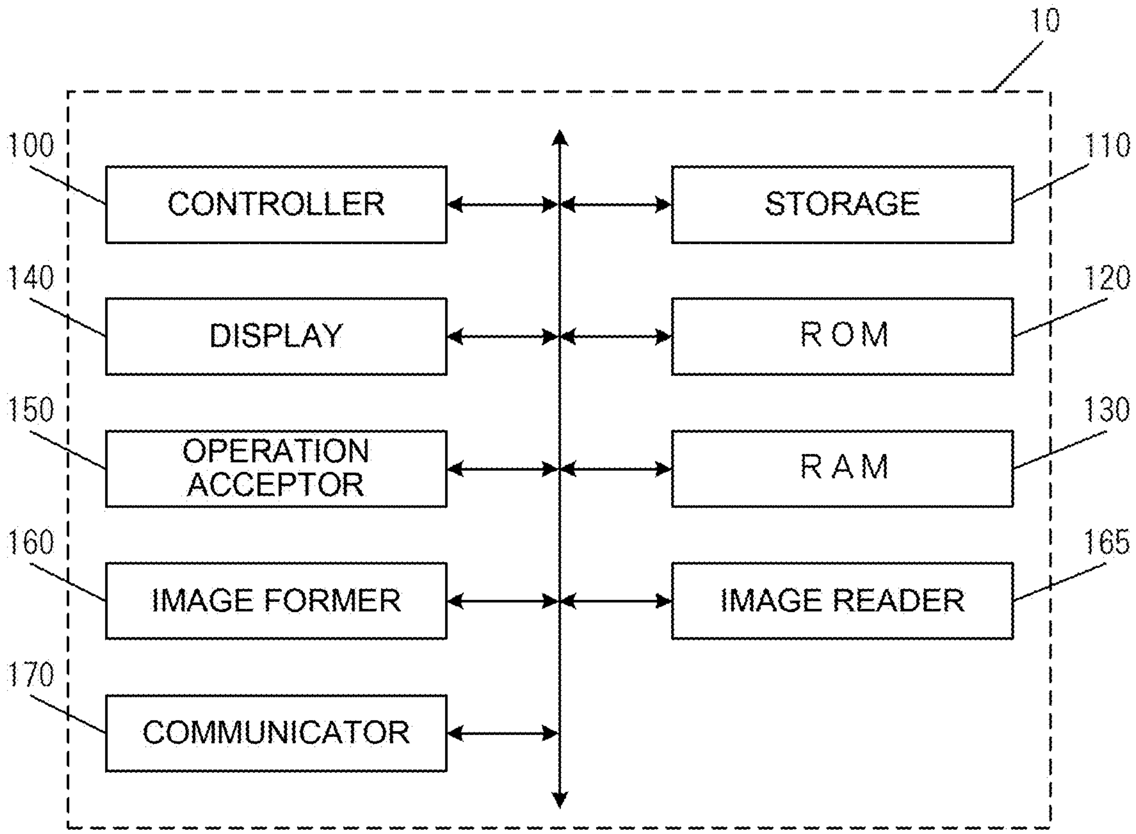
FIG. 2 is a diagram illustrating a hardware configuration of an image forming apparatus according to the first embodiment.
Figure 3:
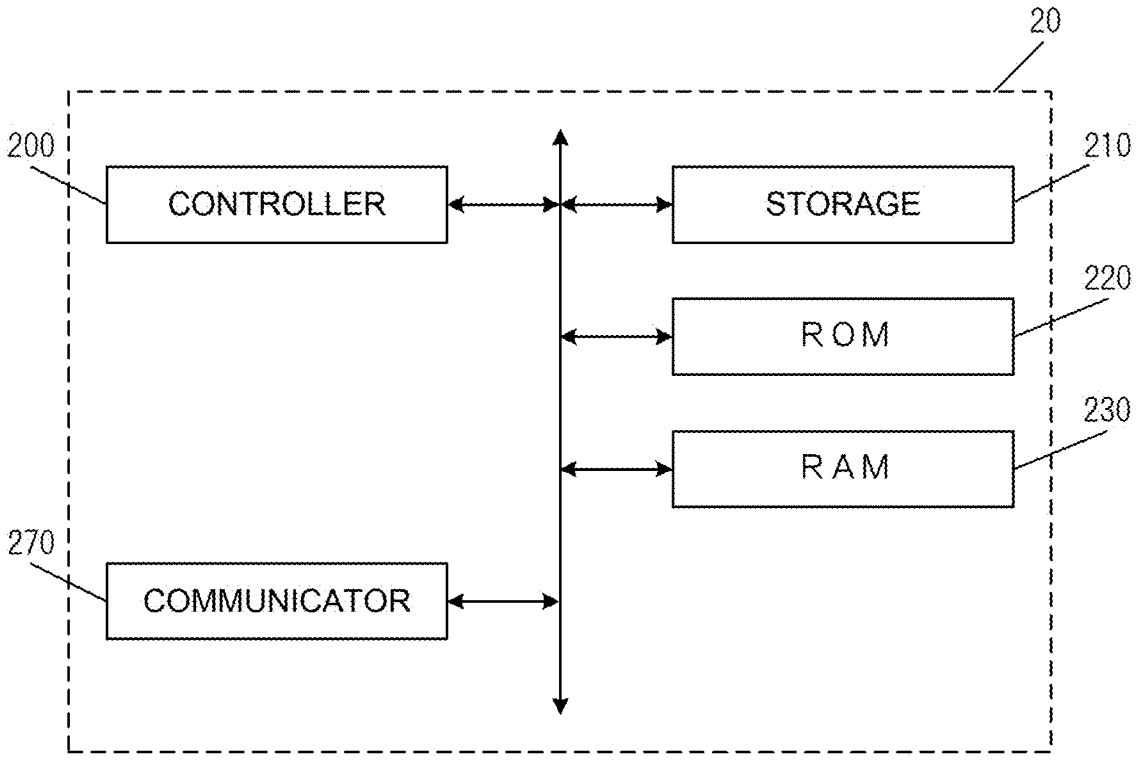
FIG. 3 is a diagram illustrating a hardware configuration of an authorization server according to the first embodiment.

Hardware configurations of the individual apparatuses will be described below with reference to the drawings. FIG. 2 is a diagram illustrating an example of a hardware configuration of the image forming apparatus 10, and FIG. 3 is a diagram illustrating an example of a hardware configuration of the authorization server 20.

1.2.1 Image Forming Apparatus

As illustrated in FIG. 2, the image forming apparatus 10 includes a controller 100, a storage 110, a Read Only Memory (ROM) 120, and a Random Access Memory (RAM) 130 that serve as storage devices (storage section), a display 140, an operation acceptor 150, an image former 160, an image reader 165, and a communicator 170.

The controller 100 controls the entire image forming apparatus 10. The controller 100 reads and executes various programs stored in the storage devices (including the storage 110 and the ROM 120) so as to realize various functions. The controller 100 may be realized by, for example, one or more control devices/computing devices (e.g., a Central Processing Unit (CPU) or a System on a Chip (SoC)). Alternatively, the controller 100 may also be configured by a control circuit.

The storage 110 is a non-volatile storage device capable of storing programs and data. For example, the storage 110 may be configured by a storage device, such as a Hard Disk Drive (HDD) or a Solid State Drive (SSD). Furthermore, the storage 110 may be configured by a Universal Serial Bus (USB) memory which is connectable to the outside. The storage 110 may be, for example, a storage region on a cloud.

The ROM 120 is a non-volatile memory capable of retaining programs and data even when power is turned off.

The RAM 130 is a main memory mainly used when the controller 100 executes processing. The RAM 130 is a rewritable memory that temporarily stores programs read from the storage 110 or the ROM 120 and data including results of execution.

The display 140 is a display device capable of displaying various pieces of information and execution screens. The display 140 may be, for example, a display device, such as a liquid crystal display (LCD), an organic Electro Luminescence (EL) display, or an electrophoretic display. Furthermore, the display 140 includes an interface to which a display device is connectable. For example, the display 140 may be configured by an external display device connected via High-Definition Multimedia Interface (HDMI) (registered trademark), Digital Visual Interface (DVI), or Display Port.

The operation acceptor 150 is an operation device that allows a user to input an operation. For example, the operation acceptor 150 may be an operation device, such as a touch panel integrated with the display 140 or an operation button. Furthermore, the operation acceptor 150 may be an operation device, such as a keyboard or a mouse. Moreover, the operation acceptor 150 may include an interface (e.g., USB) to which an operation device is connectable. For example, the image forming apparatus 10 may be connected to a different operation device (an operation device with a touch panel).

The image former 160 forms an image, for example, on a recording sheet. The image former 160, for example, includes an image carrier, forms a toner image on the image carrier, and transfers the image on the image carrier onto the recording sheet, thereby forming an image. The image former 160 may be configured as an image forming apparatus, such as a printer. Furthermore, the image former 160 may electronically form an image as an image file.

The image reader 165 reads a document (image) to be output as image data. The image reader 165 is, for example, a scanner, and may be a reading device using a Charge Coupled Device (CCD) or a Contact Image Sensor (CIS).

The communicator 170 is a communication interface that communicates with other devices. For example, the communicator 170 may be a network interface capable of providing wired connection or wireless connection. In this embodiment, communication with other devices is available via the network NW.

1.2.2 Authorization Server

As illustrated in FIG. 3, the authorization server 20 includes a controller 200, a storage 210, a ROM 220, and a RAM 230 that serve as storage devices, and a communicator 270.

Note that only one authorization server 20 is illustrated for convenience of explanation but a plurality of authorization servers 20 are provided for respective services in which authorization is executable. For example, a provider of a service, such as Google (Registered Trademark), FaceBook (Registered Trademark), or Twitter (Registered Trademark), as a service for performing authorization prepares each authorization server 20. Note that, although a single server device is described as the authorization server 20 in this embodiment, functions and the data may be distributed in required server devices as needed.

The controller 200 is a functional section for controlling the entire authorization server 20. The controller 200 realizes various functions by reading and executing various programs stored in the storage 210 and the ROM 220 and may be realized by at least one control device/computing device (CPU or SoC).

The storage 210 is a non-volatile storage device capable of storing programs and data. For example, the storage 110 may be configured by a storage device, such as a Hard Disk Drive (HDD) or a Solid State Drive (SSD). Furthermore, the storage 210 may be configured by a USB memory connectable to the outside, a CD-ROM drive, or a Blu-ray disc (BD) drive. Furthermore, the storage 210 may be, for example, a storage region on a cloud.

The ROM 220 is a non-volatile memory capable of retaining programs and data even when power is turned off.

The RAM 230 is a main memory mainly used when the controller 200 executes processing. The RAM 230 is a rewritable memory that temporarily stores programs read from the storage 210 or the ROM 220 and data including results of execution.

The communicator 270 is a communication interface that communicates with other devices. For example, the communicator 170 may be a network interface capable of providing wired connection or wireless connection. In this embodiment, authentication and authorization are executed in response to a request from the image forming apparatus 10.

Furthermore, in addition to the configuration illustrated in FIG. 3, the authorization server 20 may further include other components, such as a display and an operation acceptor. Alternatively, a display device and an operation device may be connected to the authorization server 20 so that the authorization server 20 realizes the same functions as the display or the operation acceptor. Furthermore, the authorization server 20 may provide a user interface for operating and managing other devices, as described below.

1.2.3 Resource Server

The resource server 30 has the same hardware configuration as the authorization server 20. Specifically, the resource server 30 includes at least a controller, a storage section (storage, ROM, and RAM), and a communicator. Furthermore, the resource server 30 is capable of providing external services. Therefore, the resource server 30 may not be a single device or may be constituted by a plurality of server devices in combination.

For example, the resource server 30 provides protocols as e-mail services, such as Simple Mail Transfer Protocol (SMTP), Post Office Protocol (POP), and Internet Message Access Protocol (IMAP). The image forming apparatus 10 may transmit and receive e-mails via the resource server 30 by performing communication using such a protocol.

1.3 Software Configuration

Figure 4:
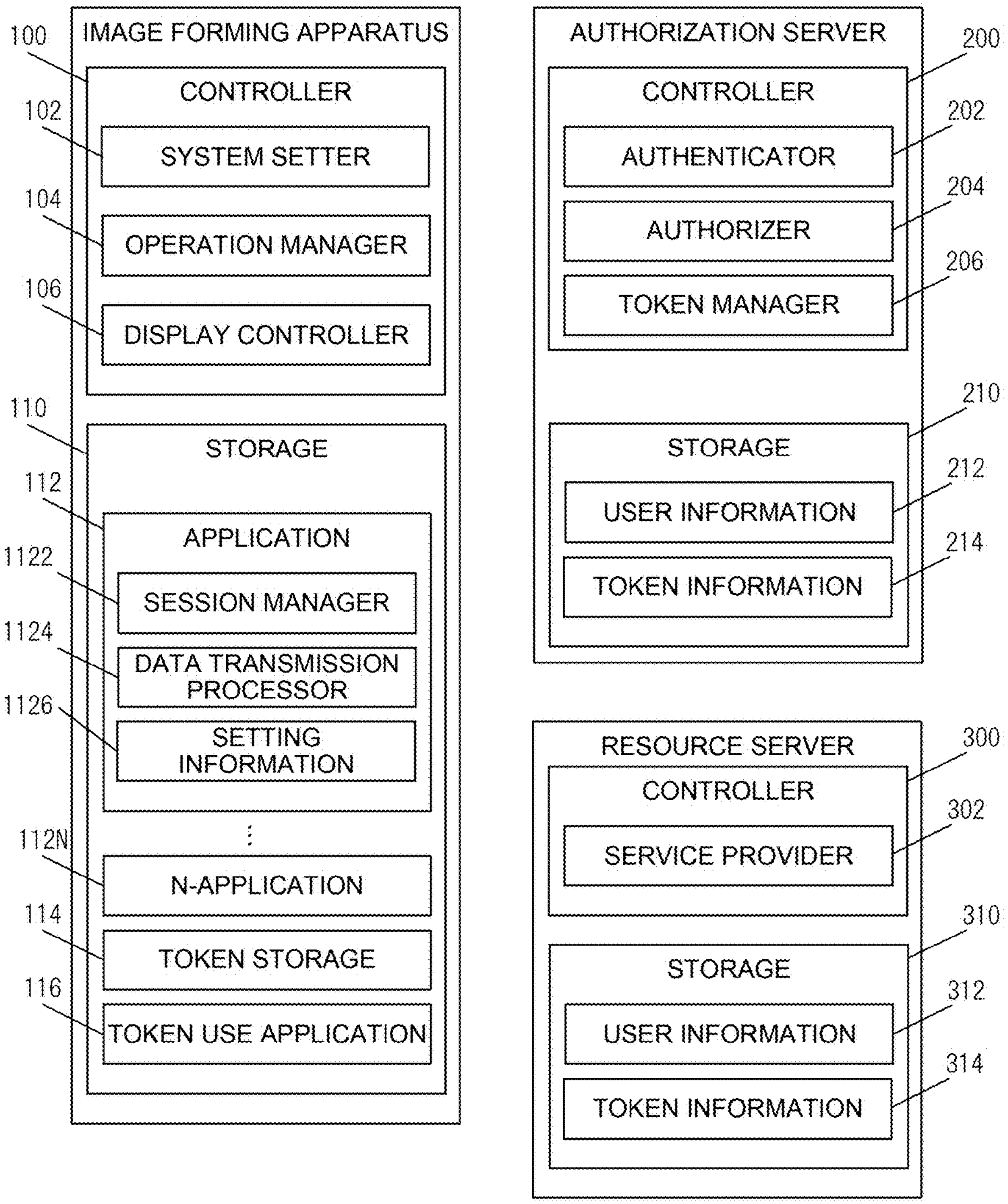
FIG. 4 a diagram illustrating a software configuration according to the first embodiment.

A software configuration will be described with reference to FIG. 4. FIG. 4 is a diagram illustrating main software configurations of the image forming apparatus 10 and the authorization server 20.

1.3.1 Image Forming Apparatus

The controller 100 of the image forming apparatus 10 functions as the following components by executing the programs (applications) stored in the storage 110 or the ROM 120.

A system setter 102 corresponds to a process implemented in advance in the image forming apparatus 10 and performs system settings. For example, the system setter 102 may perform a setting of a network service used by the image forming apparatus 10. In this embodiment, the system setter 102 is capable of performing settings of an e-mail address, a provider to be used for e-mail transmission/reception, an authentication method in e-mail transmission/reception, and the like.

The system setter 102 may be realized when at least one program stored in the storage section (storage 110 or ROM 120) as firmware is executed, for example. Furthermore, a dedicated circuit (control device) corresponding to the system setter 102 may be provided.

Furthermore, the system setter 102 is capable of obtaining information from the application 112 stored in the storage 110. For example, the system setter 102 is capable of obtaining information (parameters, setting values, and the like) stored in the application 112 without activating or executing the application 112 described below.

An operation manager 104 corresponds to a function realized when the application 112 is executed. The operation manager 104 obtains an access token for the authorization server 20 and manages a communication session.

Hereinafter, execution of the application 112 has the same meaning as operation of the operation manager 104 in this specification. Furthermore, the image forming apparatus 10 can store at least one application 112. The operation manager 104 is executed every time the application 112 is executed.

A display controller 106 displays information in accordance with the display 140. Here, in this embodiment, the display controller 106 is, for example, a function realized when a browser application is executed. For example, the display controller 106 displays information obtained from a server or executes an application on a browser application. Furthermore, the system setter 102 may be realized through the display controller 106. For example, the system setter 102 causes the display controller 106 to display a screen serving as an interface for setting the system. That is, by using the system setting screen displayed on a browser, the user can set values of setting items in the system.

Furthermore, information associated with a display screen displayed by the display controller 106 may be represented by Hyper Text Markup Language (HTML) or Extensible Markup Language (XML), for example. When the display screen is an operation screen, the display controller 106 may accept an operation input.

The storage 110 stores at least one application 112. For example, N applications (N-application 112N) are stored as applications. Note that, in this embodiment, for convenience of description, the application 112 supporting the authorization server 20 that provides a first authorization service will be described as an example.

The application 112 includes programs (modules) that realize a session manager 1122 and a data transmission processor 1124. The session manager 1122 manages, for example, a session between the image forming apparatus 10 and the authorization server 20. The session manager 1122 can manage, for example, an operation screen of the image forming apparatus 10 which performs authorization. That is, the session manager 1122 enables the display controller 106 to call OAuth authentication on a certain operation screen and return to the same operation screen again after the authentication.

The data transmission processor 1124 transmits data to the authorization server 20 where appropriate. For example, the authentication information and the authorization information obtained in the image forming apparatus 10 are transmitted to the authorization server 20. The data transmission processor 1124 can transmit (or receive) data corresponding to a cloud service when communication with the cloud service is required, for example, when a token is obtained in this embodiment.

Furthermore, the application 112 stores setting information 1126 for the authorization server 20. The setting information 1126 may store, for example, information on a provider, positions where individual functions are executable (for example, information on a call target, such as an address, a URL, and a page position), and the like. Alternatively, the setting information 1126 may store information where appropriate.

An example of the setting information 1126 is illustrated in FIG. 5. The setting information 1126 stores, for example, a provider name (for example, "ExampleProvider") that provides the authorization server 20, information on a call target of a token obtaining flow start function (for example, "http://127.0.0.1:10080/Example/auth"), a call target of a token obtaining function (for example, "http://127.0.0.1:10080/Example/token"), support for an authorization code flow (for example, "true"), and support for a device flow (for example, "true"). Since the application 112 stores the setting information 1126, information is stored for each provider. Accordingly, for example, whether the provider permits the authorization code flow or the device flow is also stored.

A token storage 114 stores tokens obtained from the authorization server 20. The token storage 114 may store an access token, a refresh token, or the like in association with the resource server 30.

A token use application 116 is capable of using a service or the like using a token (access token). The token use application 116 may perform transmission/reception of content with the resource server 30, for example.

1.3.2 Authorization Server

The controller 200 of the authorization server 20 functions as the following components by executing the programs (applications) stored in the storage 210 or the ROM 220.

An authenticator 202 performs authentication using authentication information received from the image forming apparatus 10 (including a user ID and a password). For example, the authenticator 202 authenticates a user by matching user information stored in user information 212 in the storage 210 with the received authentication information.

An authorizer 204 performs authorization based on authorization information received from the image forming apparatus 10 (information on authority to be authorized for a user, for example).

A token manager 206 issues, stores, or removes a token (access token, refresh token, or the like), that is, manages tokens. The issued token (access token) may be stored in token information 214 in the storage 210.

1.3.3 Resource Server

A controller 300 of the resource server 30 functions as the following components by executing programs (applications) stored in a storage 310 or a ROM 320.

A service provider 302 is used when the resource server 30 provides a service to other devices, such as the image forming apparatus 10. The service provider 302 provides an e-mail service, for example.

A storage 310 stores user information 312 and token information 314. The user information 312 stores information on users who can use services provided by the resource server 30.

The token information 314 stores access tokens received from the authorization server 20. Here, in receiving an access token from the image forming apparatus 10, the service provider 302 authenticates a user corresponding to the access token when the received access token matches an access token stored in the token information 314, and therefore, provides a service.

1.4 Flow of Processing

A flow of an obtainment of an access token according to this embodiment will be described with reference to a sequence in a drawing. Note that, although the system setter 102, the operation manager 104, the display controller 106, and the like appropriately perform respective processes of the following description in the image forming apparatus 10, the description will be made assuming that the controller 100 executes the individual processes. Similarly, the description will be made assuming that the display controller 200 executes individual processes in the authorization server 20.

Figure 6:
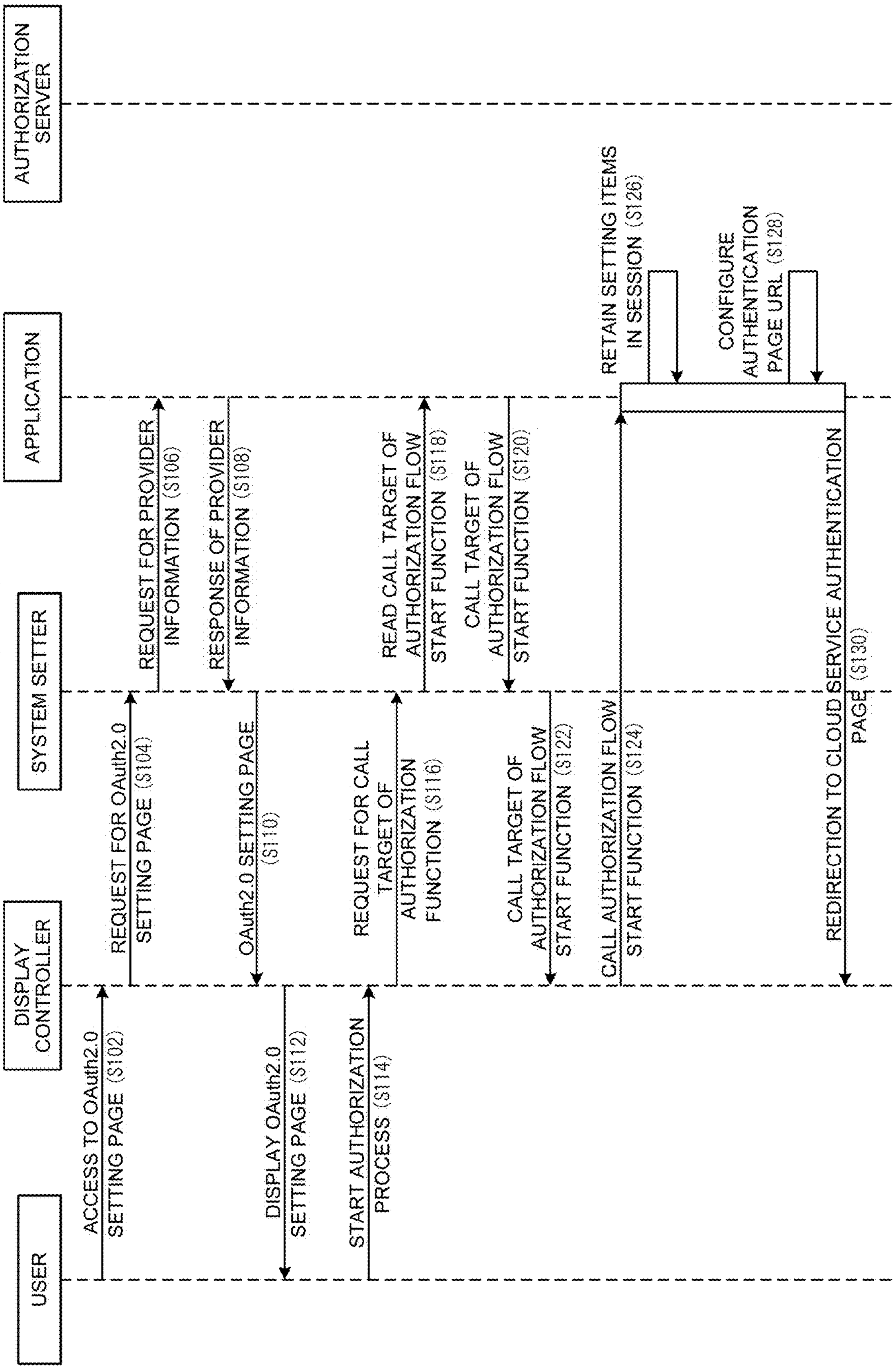
FIG. 6 is a sequence diagram illustrating a process according to the first embodiment.

As illustrated in FIG. 6, a user accesses an OAuth2.0 setting page (S102). Specifically, the user requests a page for which a setting of OAuth2.0 is required in a system setting page displayed by the display controller 106.

The display controller 106 requests the page for the setting of OAuth2.0 from the system setter 102 (S104).

Here, the system setter 102 requests provider information available for OAuth from the installed application 112 (S106). Specifically, the system setter 102 obtains information on a provider from the application 112 (application 112 installed in image forming apparatus 10) stored in the storage 110 (S108). Here, the system setter 102 reads a provider name (service name).

Then the system setter 102 obtains a list of available providers (list of provider names) and displays a setting page including options of selection from the obtained list of providers in the OAuth2.0 setting page (S110 and S112).

Subsequently, the user starts an authorization process in the OAuth2.0 setting page (S114). Here, the user inputs account information of the user to be used in the authorization (authentication) before starting the authorization process. For example, an e-mail address of the user is input in the OAuth2.0 setting page before the authorization process is started.

Subsequently, the display controller 106 requests a call target of an application authorization function from the system setter 102 (S116). For example, the system setter 102 calls a call target (for example, a URL) of an authorization flow start function corresponding to a provider from the application 112 corresponding to the currently selected provider (S118).

Here, the application 112 has the call target of the authorization flow start function. Therefore, even when the call target of the authorization flow start function is changed, for example, the call target stored in the application 112 is simply changed.

The system setter 102 obtains the call target of the authorization flow start function from the application 112 (S120). The display controller 106 obtains the call target of the authorization flow start function from the system setter 102 (S122).

The display controller 106 calls the authorization flow start function from the application 112 for authentication/authorization (S124). Here, the display controller 106 also transmits the account information input in step S114 to the application 112.

When the application 112 is executed, the operation manager 104 first stores items for setting OAuth2.0 (S126). Then, the operation manager 104 configures a URL of an authentication page for authenticating the user, transmits the URL to the display controller 106, and makes a redirection request (S130).

Specifically, the display controller 106 operates such that the redirection to the URL of the authentication page is performed by the operation manager 104. The display controller requests the authentication page from the authorization server 20 (S140), and acquires the authentication page to be displayed from the authorization server 20 (S142 and S144).

The user inputs authentication information to the authorization server 20 so that an authentication process is executed (S146). Here, the authentication information is used to authenticate the user in the authorization server 20. The authentication information may be a combination of the account information of the user and a password or the like. Furthermore, a password, information used for biometric authentication, or the like may be transmitted together with the account information input in S114.

The display controller 106 transmits the authentication information to the authorization server 20 (S148). When the user authentication is appropriately performed based on the received authentication information, the authorization server 20 subsequently transmits an authorization page to the display controller 106 (S152).

When obtaining the authorization page, the display controller 106 displays the authorization page for the user (S154). Here, the display controller 106 uses the authorization page to cause the user to select or confirm an authority for permitting each function.

When the user executes authorization (an authority for permitting a function, for example) (S156), the display controller 106 transmits the authorization information to the authorization server 20 (S158).

The authorization server 20 executes the authorization process (S160), and when the authorization process is appropriately executed, transmits a response to be redirected to a redirection accepting point of the application 112 to the display controller 106 (S162). Here, a redirection destination may be set in advance. Furthermore, the authorization server 20 also transmits an authorization code.

When receiving the redirection response from the authorization server 20, the display controller 106 performs redirection to the redirection accepting point of the application 112 obtained from the authorization server 20 (S164).

When the application 112 is executed, the operation manager 104 reads the setting items retained in step S126 (S166). Thereafter, the operation manager 104 transmits a response indicating redirection to the setting items in the system setting to the display controller 106 (S168). Furthermore, the operation manager 104 may additionally transmit an authorization code to the display controller 106 at the time of redirection so as to utilize the authorization code.

The display controller 106 performs redirection in response to the process in step S168 to access the system setter 102 (S172). Here, the display controller 106 performs the redirection for the setting items being set.

The system setter 102 reads a call target of a token process function from the application 112 (S174 and S176).

The system setter 102 transmits the authorization code to the application 112 and requests a token (S178).

When the application 112 is executed, the operation manager 104 transmits the received authorization code to the authorization server 20 and requests an access token (S180). When the authorization code is appropriate, the authorization server 20 transmits the access token to the operation manager 104 (S182).

When obtaining the access token from the authorization server 20, the operation manager 104 transmits the token to the system setter 102 (S184). After storing the access token (S186), the system setter 102 transmits a request for displaying a setting page to be displayed after completion of obtainment of a token to the display controller 106 (S188).

The display controller 106 displays the setting page to be displayed after the access token is obtained for the user (S190).

1.5 Operation Example

Figure 9:
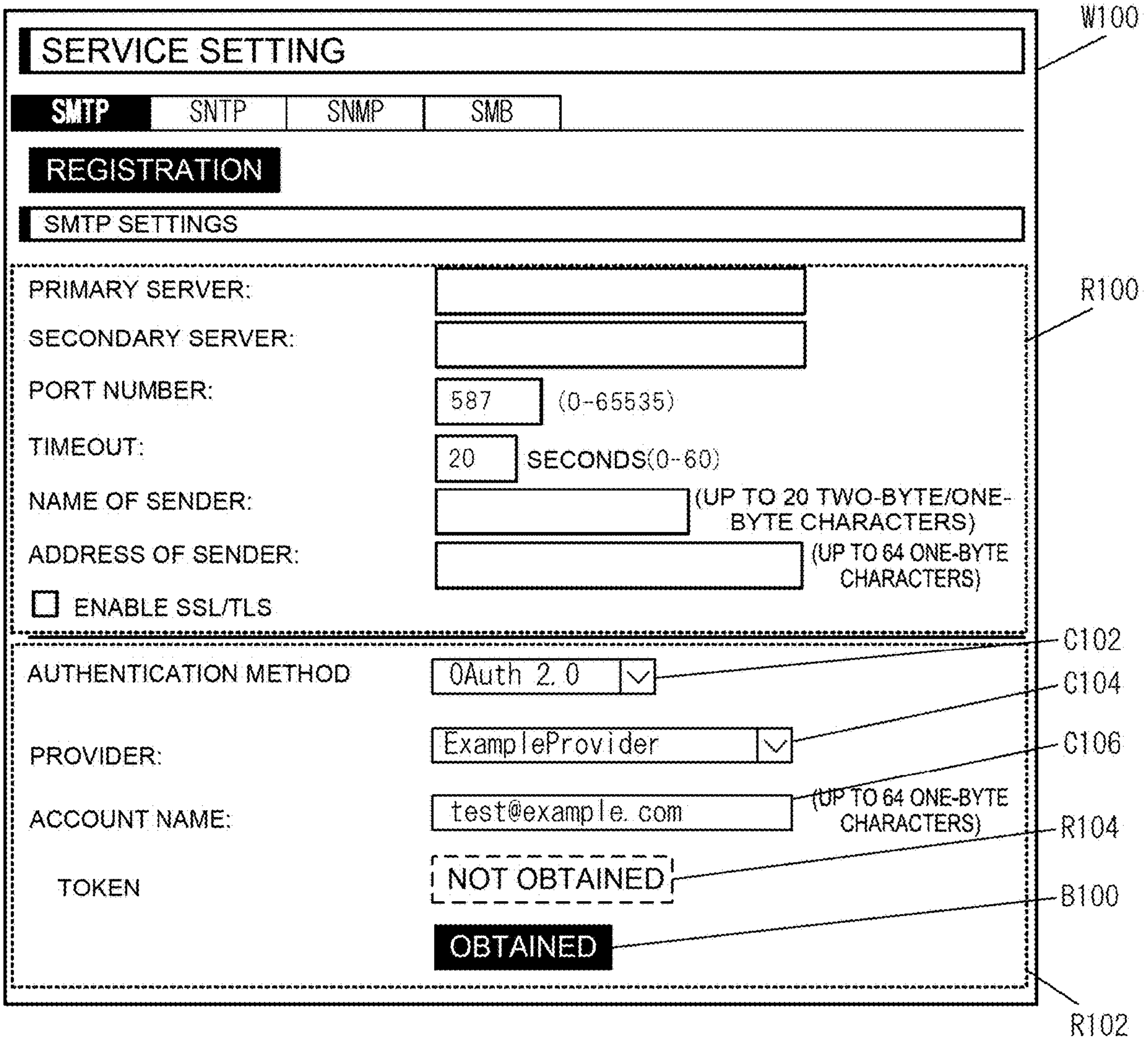
FIG. 9 is a diagram illustrating an operation example (screen example) according to the first embodiment.

An operation example will be described using examples of display screens. FIG. 9 is a diagram illustrating an example of a display screen W100 displaying the OAuth2.0 setting page. The display screen W100 is displayed on the display 140 by the display controller 106 when the system setter 102 generates the OAuth2.0 setting page.

For example, the setting page is generated by the system setter 102 using the HTML or the XML and is displayed by a browser function of the display controller 106.

Here, on the display screen W100, an SMTP setting may be performed among the system settings. The display controller 106 displays the SMTP setting in a region R100 and displays the OAuth2.0 setting in a region R102. Note that the display screen for performing the OAuth2.0 setting may be separately provided or may be a pop-up display.

In an item C102, an authentication method in the SMTP setting is selectable. In the item C102, a use of OAuth2.0 is selected. In an item C104, a provider which performs the OAuth authentication is selectable. For example, in the item C104, provider names read from the application 112 installed in the image forming apparatus 10 are displayed in a selectable manner using a list box (list form).

When the user selects a selectable provider in the list box, the provider to be used in the OAuth authentication (authorization server 20) is determined. Furthermore, account information (for example, an account name) may be input to an item C106.

In a region R104, a current state of obtainment of a token (access token) is displayed. In the display screen W100, "not obtained" is displayed as the token obtaining state which indicates that an access token has not been obtained. Here, when the user selects an obtainment button B100, the authentication process and the authorization process are executed for the selected provider.

Here, when the user selects the obtainment button B100, the authorization process is started, and the operation manager 104 corresponding to the executed application 112 stores the items being set. For example, in a case of the display screen W100, the operation manager 104 stores information indicating that the OAuth authentication is set in the SMTP setting of the service setting (S126 in FIG. 6).

Figure 7:
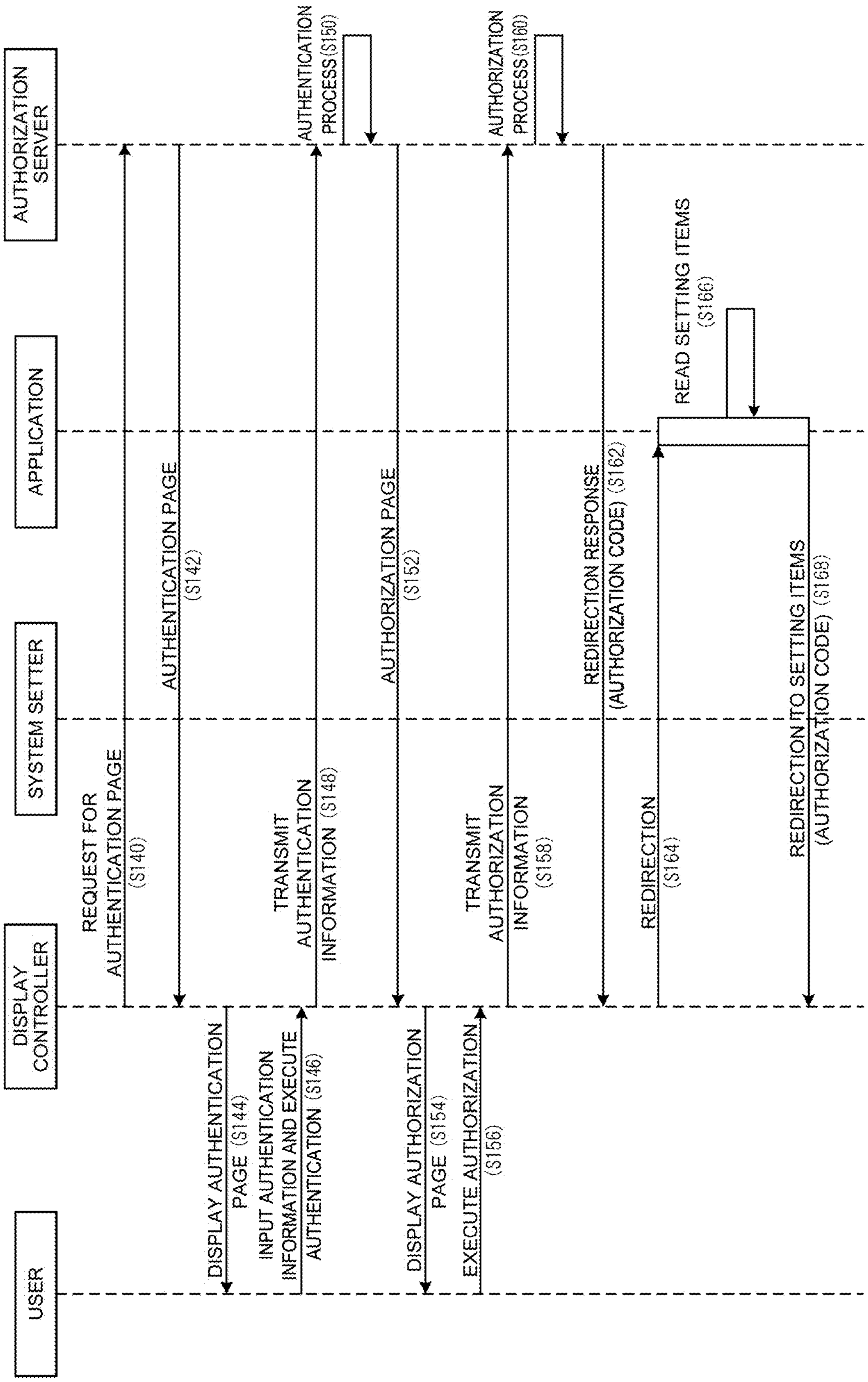
FIG. 7 is a sequence diagram illustrating the process according to the first embodiment.
Figure 8:
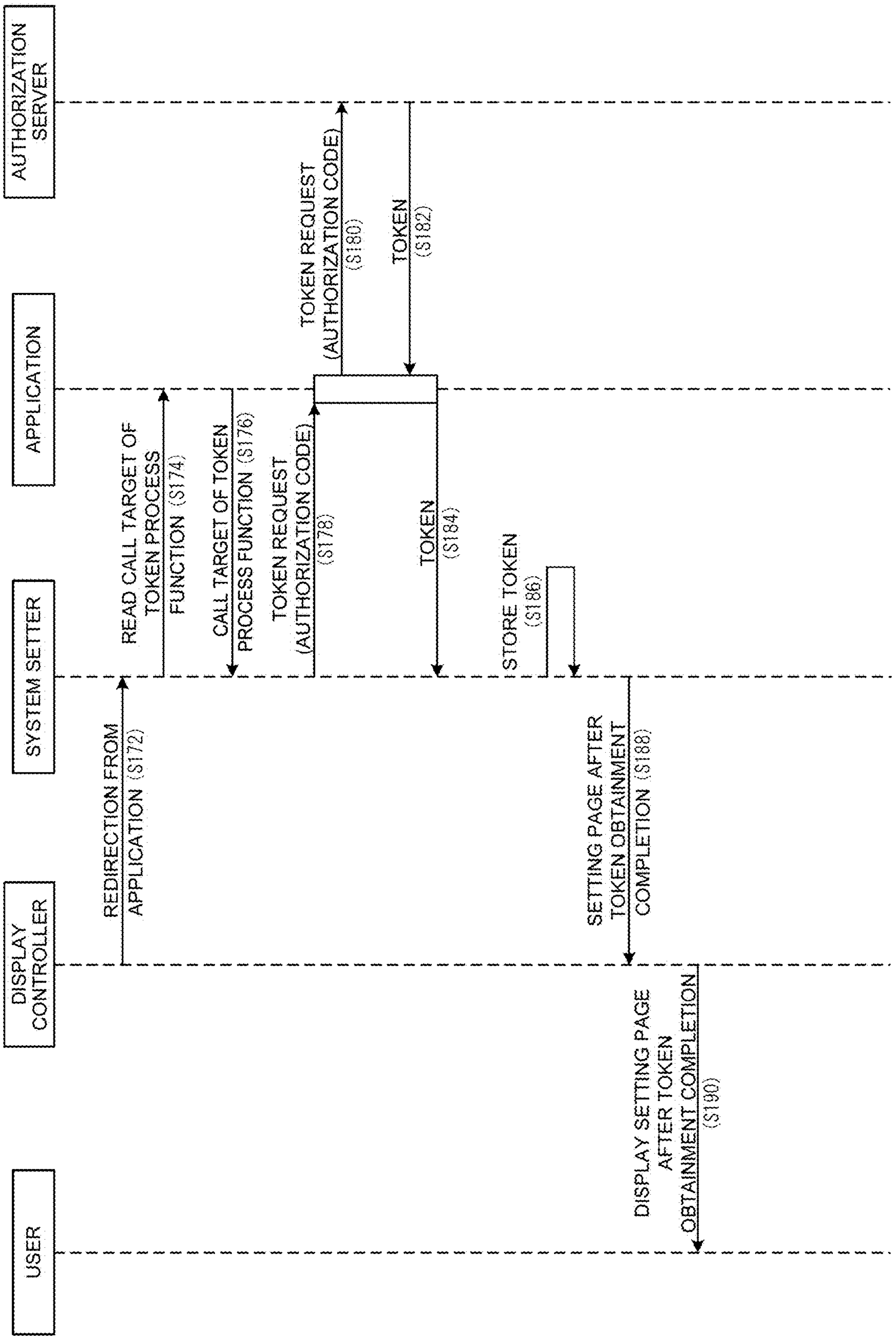
FIG. 8 is a sequence diagram illustrating the process according to the first embodiment.

By this, after the authorization server 20 executes the authentication process (S150 in FIG. 7) and the authorization process (S160 of FIG. 7), the SMTP setting in the service setting which is one of the setting items set in the display screen W100 may be displayed again (S166 and S168 in FIG. 7).

Figure 10A:
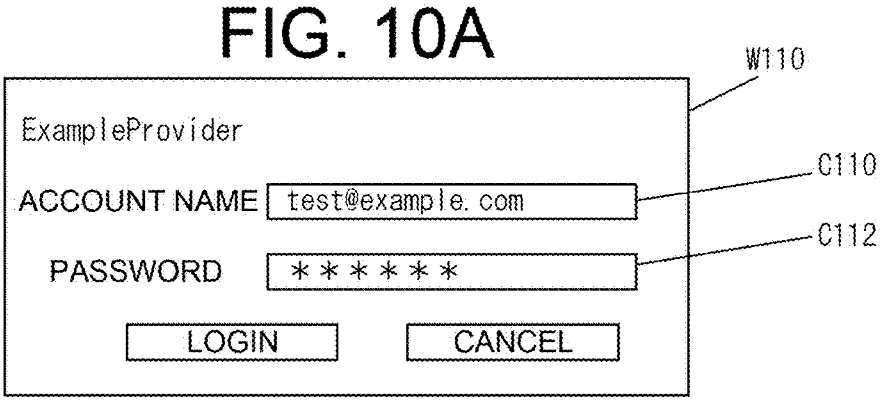
FIG. 10A is a diagram illustrating an operation example (screen example) according to the first embodiment.

A display screen W110 of FIG. 10A is an example of a screen to which the authentication information required for executing the authentication process by the authorization server 20 can be input. For example, the display controller 106 may display the display screen W110 so as to be superimposed on a currently displayed screen, or may display the display screen W110 as a different display screen by switching.

In the display screen W110, an account name (item C110) and a password (item C112) to be used in the authentication process by the authorization server 20 may be input. Note that, in the display screen W110, a case of use of password authentication is displayed as an example, but other methods may be used. For example, the display screen W110 may be used to input a one time password or execute biometrics authentication.

Figure 10B:
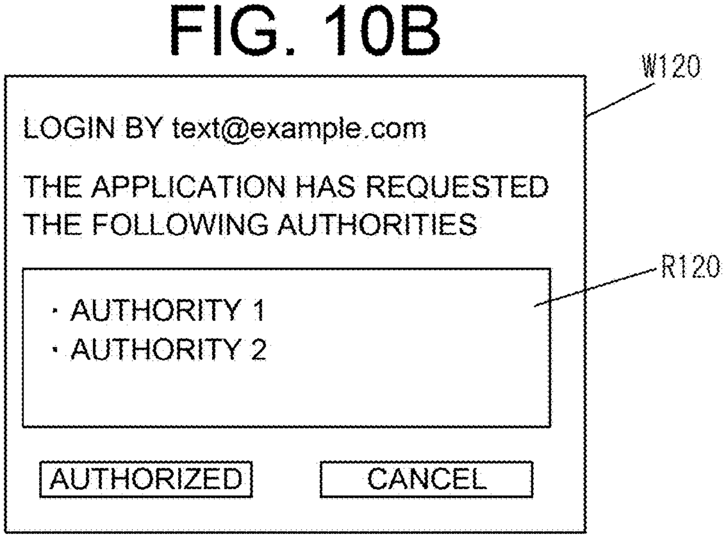
FIG. 10B is a diagram illustrating an operation example (screen example) according to the first embodiment.

A display screen W120 of FIG. 10B is an example of a screen for confirming the authorization information required for executing the authorization process by the authorization server 20. For example, the display controller 106 may display the display screen W120 so as to be superimposed on a currently displayed screen, or may display the display screen W120 as a different display screen by switching.

The display screen W120 displays authorities that may be authorized in a region R120. For example, the display screen W120 can display an authority to permit e-mail transmission and e-mail reading. When the user selects "authorized", the authority is transmitted as authorization information to the authorization server 20.

Figure 10C:
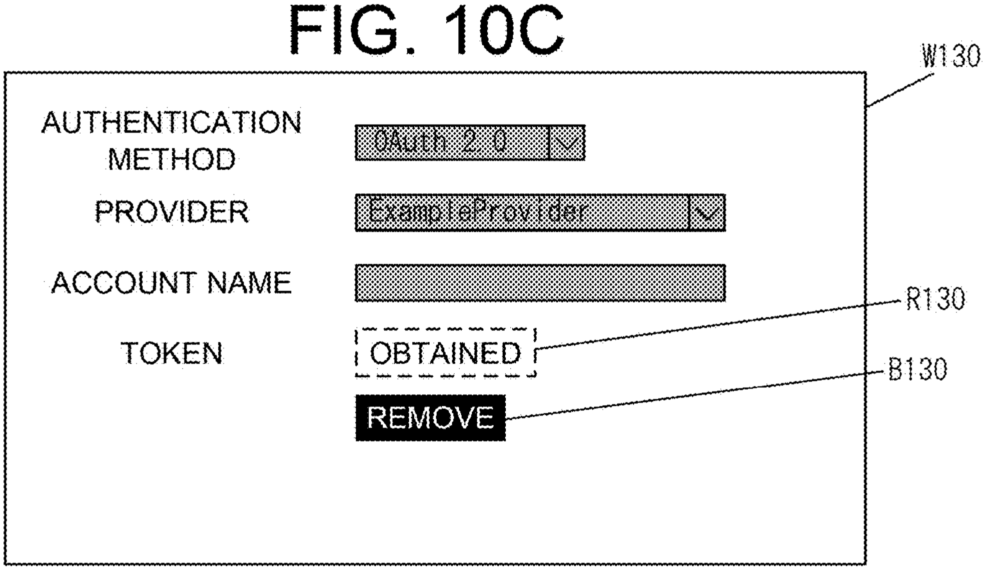
FIG. 10C is a diagram illustrating an operation example (screen example) according to the first embodiment.

FIG. 10C is a diagram illustrating a display screen W130 displaying items displayed in the region R102 of FIG. 9. In a region R130, "obtained" is displayed as a current state of obtainment of an access token. Specifically, since "obtained" is displayed in the region R130, the user can confirm that the authorization server 20 has executed the authentication process and the authorization process and the application 112 (operation manager 104) has acquired an access token.

Note that, although processes will be described hereinafter, the image forming apparatus 10 may remove an obtained access token when the user selects a removal button B130.

2. Second Embodiment

In a second embodiment, a case where a service is executed using an access token will be described.

Figure 11:
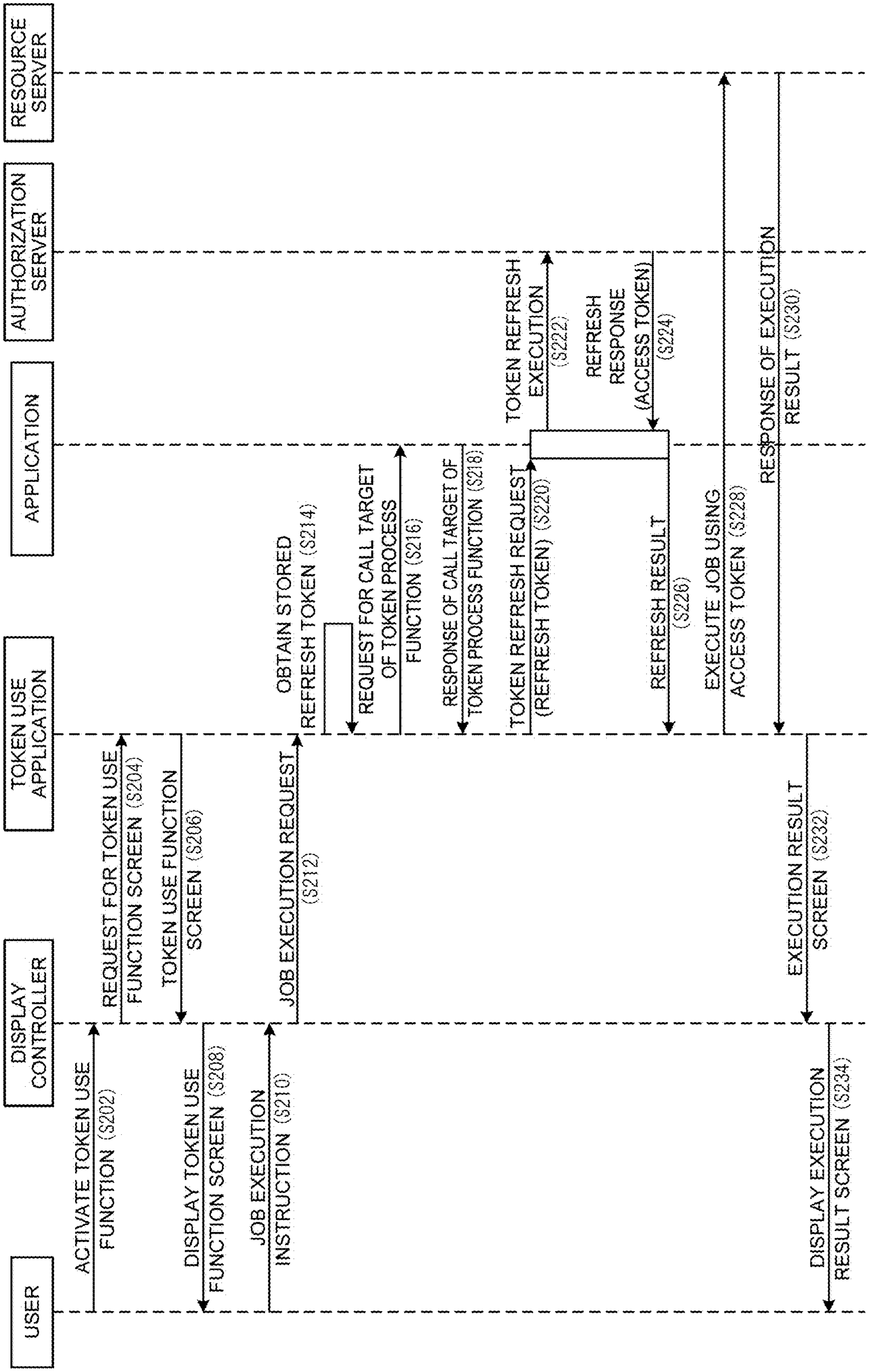
FIG. 11 is a sequence diagram illustrating a process according to a second embodiment.

A hardware configuration and a software configuration of the second embodiment is the same as those of the first embodiment. In the second embodiment, a process in FIG. 11 is executed.

A user issues an instruction for activating a function using a token to a display controller 106 (S202). For example, the user selects a function using an access token from among functions displayed in a display 140 by the display controller 106. Here, the user selects a token use application 116 for executing an e-mail transmission function as an example of a function using an access token.

Figure 12:
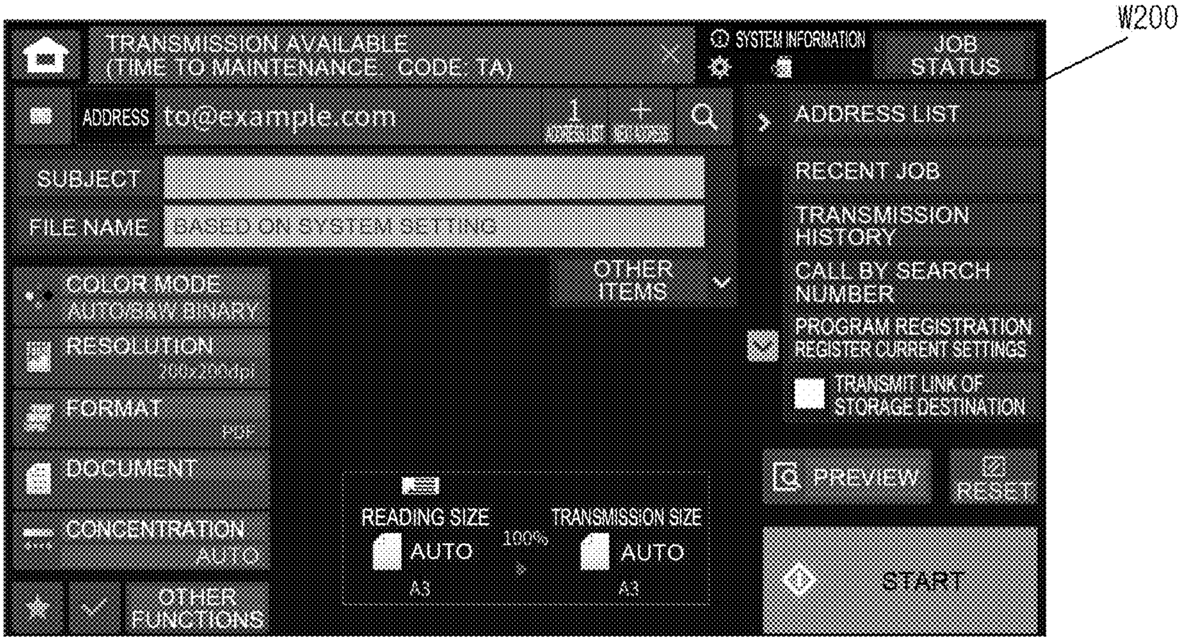
FIG. 12 is a diagram illustrating an operation example (screen example) according to the second embodiment.

A controller 100 calls and executes the token use application 116. By this, the display controller 106 transmits a request of a screen for the function using a token to the token use application 116 (S204). Then the controller 100 executes the token use application 116. The display controller 106 displays a display screen for the token use application 116 (S206 and S208). For example, a display screen W200 in FIG. 12 is an example of a screen for executing a job of transmitting a scanned image to a designated address by e-mail. The application corresponding to the display screen W200 uses an access token for SMTP authentication at a time of e-mail transmission.

The user issues an instruction for executing a job in a display screen displayed by the display controller 106 (S210). When a start button is selected in the display screen W200 of FIG. 12, for example, a job for transmitting an e-mail including image data of a scanned image added thereto to the e-mail address set as the destination is executed.

The display controller 106 transmits a job execution request to the token use application 116 (S212). The token use application 116 executes a job using a stored access token.

For example, the token use application 116 obtains a stored refresh token (S214). Here, the token use application 116 requests and obtains a call target of a token process function from the application 112 (S216 and S218).

The token use application 116 issues a token refresh request to the application 112 (S220). At this time, the token use application 116 may transmit a refresh token to the application 112.

When the application 112 is executed, an operation manager 104 executes token refresh based on a call target of the token process function (S222). An authorization server 20 executes a process of the token refresh and transmits an access token to an operation manager 104 (S224). The operation manager 104 stores the received access token in a token storage 114. Then the operation manager 104 notifies the application 112 of the execution of the token refresh process or the obtainment of the access token (S226).

When receiving a result indicating that the token refresh has been performed from the operation manager 104 (application 112), the token use application 116 executes a job using the access token (S228). For example, the token use application 116 performs authentication in the resource server 30 using the access token and transmits an e-mail by SMTP of the resource server 30.

When receiving a response of a result of the execution from the resource server 30 (S230), the token use application 116 transmits an execution result screen to the display controller 106 (S232). The display controller 106 displays the execution result screen for the user to complete the execution of the job (S234).

Note that the token use application 116 may execute a job using an access token within an expiration date of the access token. Specifically, the process may be skipped from step S212 to step S228 in FIG. 11.

Furthermore, the token use application 116 may attempt a data obtaining request to the resource server 30 using an access token, and thereafter, transmit a token refresh request using a refresh token when the access token is expired.

3. Third Embodiment

Figure 13:
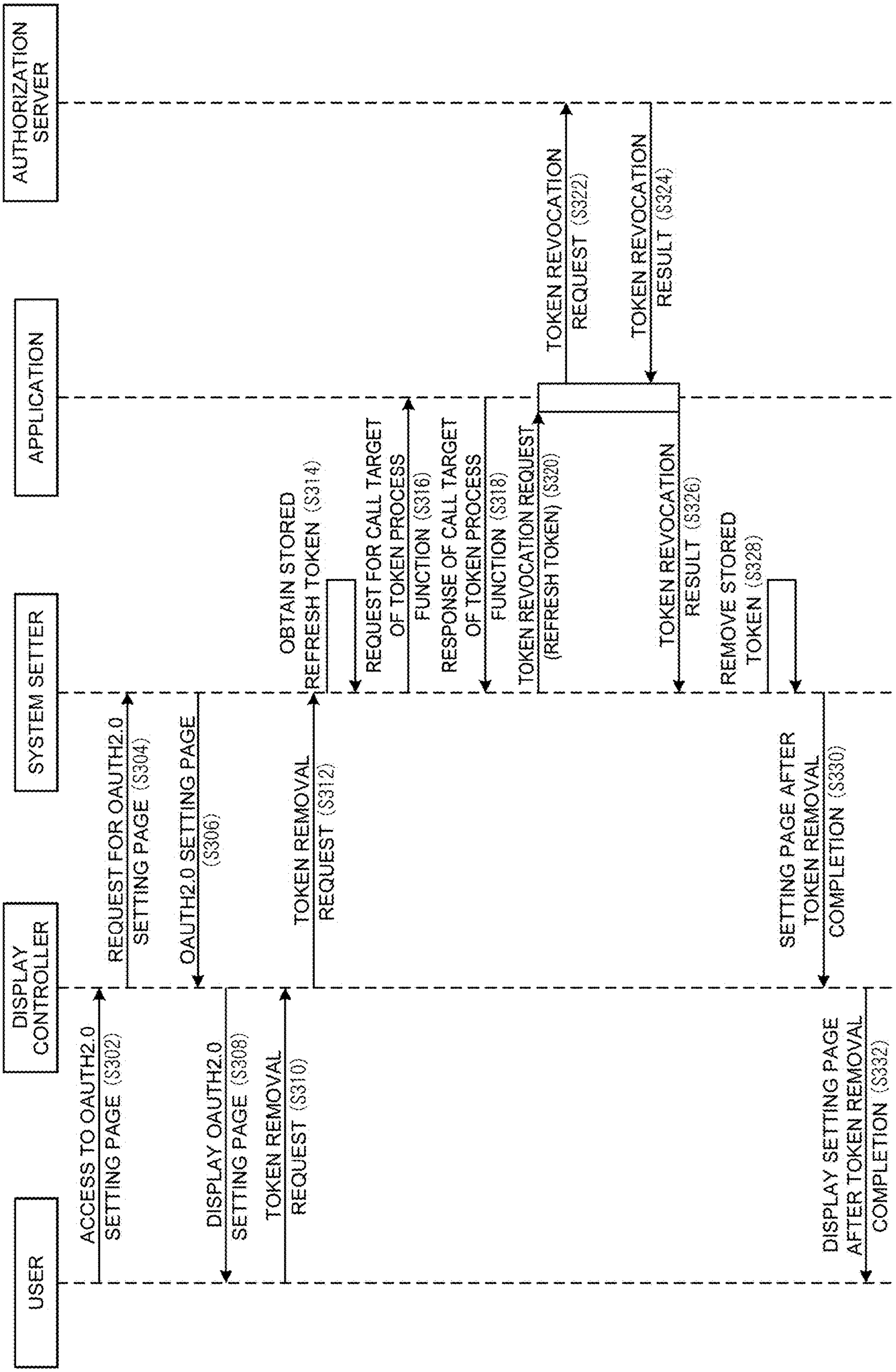
FIG. 13 is a sequence diagram illustrating a process according to a third embodiment.

The following is a third embodiment in which a token is removed. A hardware configuration and a software configuration of the third embodiment is the same as those of the first embodiment. In the third embodiment, a process in FIG. 13 is executed.

First, a user accesses an OAuth2.0 setting page (S302). Specifically, the user requests a page for which a setting of OAuth2.0 is required in a system setting page displayed by a display controller 106. The display controller 106 requests a page for the setting of OAuth2.0 from a system setter 102 (S304).

The system setter 102 transmits the OAuth2.0 setting page to the display controller 106, and the display controller 106 displays the OAuth2.0 setting page for the user (S306 and S308).

The user selects a token removal request on the OAuth2.0 setting page (S310). For example, the removal button B130 in FIG. 10C is selected by the user.

After the display controller 106 transmits the token removal request to the system setter 102 (S312), the system setter 102 obtains a stored refresh token (S314). Then the system setter 102 requests (S316) and obtains (S318) a call target of a token process function from the application 112.

The system setter 102 issues the token revocation request to the application 112 (S320). At this time, the system setter 102 also transmits the obtained refresh token to the application 112.

When the application 112 is executed, an operation manager 104 issues a token revocation request to an authorization server 20 (S322). Here, the operation manager 104 transmits a refresh token to the authorization server 20.

The authorization server 20 removes the tokens corresponding to the received refresh token (access token and refresh token). Thereafter, the authorization server 20 transmits a result of the token revocation to the operation manager 104 (S324).

The operation manager 104 transmits the received token revocation result to the system setter 102. The system setter 102 removes the stored tokens (refresh token and access token) based on the received token revocation result (S328). Furthermore, the system setter 102 transmits a setting page obtained after completion of the token removal to the display controller 106. The display controller 106 displays the received setting page obtained after the completion of the token removal for the user (S332).

4. Modifications

The present disclosure is not limited to the above-described embodiments, and various modifications may be made. That is, the technical scope of the present disclosure also includes such embodiments that can be obtained by combining technical measures that are modified as appropriate within a range not departing from the gist of the present disclosure.

In the above-described embodiment, the image forming apparatus is described as an example of an information processing apparatus. However, the present disclosure is applicable to other apparatuses as the information processing apparatus. Examples of the information processing apparatus include a smartphone and a tablet terminal. The examples further include a home appliance (such as an air conditioner, a refrigerator, or a television set) equipped with an IoT function. The examples are not limited to stationary apparatuses, and further include a portable apparatus and an in-vehicle apparatus. Examples of the in-vehicle apparatus include a car navigation system.

Furthermore, although the above-described embodiments are individually described for convenience of explanation, the embodiments may be executed in combination within a possible range. Moreover, the applicant intends to acquire rights to any of the technologies described in the specification through amendments, divisional applications, or the like.

Furthermore, programs that run on each device in each embodiment control the CPU and the like (programs that cause a computer to function) so as to achieve the functions of the above-mentioned embodiments. Moreover, information handled by these devices is temporarily stored in a temporary storage device (for example, a RAM) when being processed, and then stored in various storage devices, such as a ROM and an HDD, where the information is read, corrected, and written by the CPU as needed.

Here, a recording medium for storing the programs may be any of a semiconductor medium (e.g., a ROM, a non-volatile memory card, etc.), an optical recording medium/magneto-optical recording medium (e.g., a Digital Versatile Disc (DVD), a CD, a BD (registered trademark), etc.), a magnetic recording medium (e.g., a magnetic tape, a flexible disc, etc.), and the like. Furthermore, in a case where the programs are to be distributed to the market, the programs may be stored in a portable recording medium for distribution or transferred to a server computer connected via a network, such as the Internet. In this case, of course, a storage device in a server apparatus is also included in the present disclosure.

Furthermore, the data described above may not be stored in the device, but may be stored in an external device and called as appropriate. For example, the data may be stored in a Network Attached Storage (NAS) or on the cloud.

Note that the scope of the present disclosure is not limited to the configurations explicitly described in the specification but includes any combination of the technologies disclosed in the present specification. In the present disclosure, the configurations to be patented are described in the appended claims. However, it is not intended to exclude configurations from the technical scope on the grounds that the configurations are not described in the claims.

In addition, the descriptions "in a/the case of/where" and "when" in the specification are explained as examples, and the configuration is not limited to the described contents. Configurations other than the cases described with "in a/the case of/where" and "when" are also disclosed to the extent that would be obvious to a person skilled in the art, and it is intended to acquire the right to such configurations.

Furthermore, the order of processing and the data flow described in the specification is not limited to the order in which they are described. For example, a configuration in which a part of processing is removed, or the order thereof is switched is also disclosed, and it is intended to acquire the right to such a configuration.

The functions described in the embodiments are described as being performed by the corresponding devices, but they may be realized by a single device or even by using an external server.

Moreover, the functional blocks or various features of the apparatuses used in the above-described embodiments may be implemented or executed as an electrical circuit such an integrated circuit or a plurality of integrated circuits. The electric circuitry designed to execute the functions described in the present specification may include a general-purpose processor, a digital signal processor (DSP), an application-specific integrated circuit (ASIC), a field-programmable gate array (FPGA) or other programmable logic devices, a discrete gate or transistor logic, discrete hardware components, or a combination of the aforementioned elements. The general-purpose processor may be a microprocessor or, alternatively, a conventional processor, a controller, a microcontroller, or a state machine. The electric circuitry described above may be constituted by a digital circuit or by an analog circuit. When advancements in semiconductor technology lead to the emergence of integrated circuit technologies that could replace the current integrated circuits, one or more of the aspects of the present disclosure may be realized using such new integrated circuit.

While there have been described what are at present considered to be certain embodiments of the invention, it will be understood that various modifications may be made thereto, and it is intended that the appended claim cover all such modifications as fall within the true spirit and scope of the invention.

What is claimed is:

1. An information processing apparatus, comprising:

a communicator that communicates with an external service and a server that issues an access token to be used to access the external service;

at least one processor; and a storage coupled to the at least one processor and storing an application, which includes one or more computer-executable instructions that, when executed by the at least one processor, cause the information processing apparatus to:

obtain information on the server by executing the application, obtain an authorization code from the server identified by the information on the server, obtain an access token from the server by executing the application using the authorization code, store, in the storage, setting items when obtaining the information on the server by executing the application, obtain, from the server and along with the authorization code, information indicating a redirection target, and read the setting items from the storage based on the information indicating the redirection target, such that a redirection to the setting items is performed.

2. The information processing apparatus according to claim 1, wherein the one or more computer-executable instructions, when executed by the at least one processor, further cause the information processing apparatus to:

execute an authentication process based on the obtained information on the server, transmit authorization information that defines a function permitted to be used by the server when the authentication process is successfully performed, and obtain the authorization code corresponding to the authorization information.

3. The information processing apparatus according to claim 1, wherein the server includes a plurality of servers, and the application is stored in the storage for each server.

4. The information processing apparatus according to claim 3, wherein the one or more computer-executable instructions, when executed by the at least one processor, further cause the information processing apparatus to:

cause a user to select one of the plurality of servers.

5. The information processing apparatus according to claim 1, wherein the one or more computer-executable instructions, when executed by the at least one processor, further cause the information processing apparatus to:

obtain a refresh token from the server, and obtain another access token from the server by executing the application using the refresh token.

6. An image forming apparatus, comprising:

a communicator that communicates with an external service and a server that issues an access token to be used to access the external service;

at least one processor; and a storage coupled to the at least one processor and storing one or more applications, which include one or more computer-executable instructions that, when executed by the at least one processor, cause the image forming apparatus to:

execute a first application, among the one or more applications, stored in advance, execute a second application being additionally installed, obtain information on the server by executing the first application, obtain, by executing the first application, an authorization code from the server identified by the information on the server, obtain, by executing the second application, an access token from the server utilizing the authorization code, store, in the storage, setting items when obtaining the information on the server by executing the first application, obtain, from the server and along with the authorization code, information indicating a redirection target, and read the setting items from the storage based on the information indicating the redirection target, such that a redirection to the setting items is performed.

7. A processing method performed by an information processing apparatus comprising a storage, the information processing apparatus communicating with an external service and a server that issues an access token to be used to access the external service, the processing method comprising:

obtaining information on the server by executing an application;

obtaining an authorization code from the server identified by the information on the server;

obtaining an access token from the server by executing the application using the authorization code;

storing, in the storage, setting items when obtaining the information on the server by executing the application;

obtaining, from the server and along with the authorization code, information indicating a redirection target; and reading the setting items from the storage based on the information indicating the redirection target, such that a redirection to the setting items is performed.

* * * * *